(12) United States Patent
Maida et al.

(10) Patent No.: US 9,067,814 B2
(45) Date of Patent: Jun. 30, 2015

(54) METHOD OF PRODUCING SYNTHETIC QUARTZ GLASS FOR EXCIMER LASER

(75) Inventors: Shigeru Maida, Joetsu (JP); Hisatoshi Otsuka, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 450 days.

(21) Appl. No.: 12/688,332

(22) Filed: Jan. 15, 2010

(65) Prior Publication Data
US 2010/0180634 A1    Jul. 22, 2010

(30) Foreign Application Priority Data
Jan. 19, 2009    (JP) .................... 2009-008648

(51) Int. Cl.
*C03B 20/00* (2006.01)
*C03B 19/14* (2006.01)

(52) U.S. Cl.
CPC ......... *C03B 19/1453* (2013.01); *C03B 19/1469* (2013.01); *C03B 2201/075* (2013.01); *C03B 2201/21* (2013.01); *C03B 2207/20* (2013.01)

(58) Field of Classification Search
CPC ...................... C03B 19/1453; C03B 2201/075
USPC ................. 65/414, 422, 426, DIG. 8
See application file for complete search history.

(56) References Cited

U.S. PATENT DOCUMENTS

| | | | |
|---|---|---|---|
| 3,868,170 A | * | 2/1975 | DeLuca ......................... 65/422 |
| 5,203,899 A | * | 4/1993 | Kyoto et al. ................... 65/398 |
| 6,990,836 B2 | | 1/2006 | Maida et al. |
| 7,514,382 B2 | | 4/2009 | Ikuta et al. |
| 2006/0183623 A1 | | 8/2006 | Ikuta et al. |

(Continued)

FOREIGN PATENT DOCUMENTS

| | | |
|---|---|---|
| EP | 1 340 722 A1 | 9/2003 |
| EP | 1 900 694 A1 | 3/2008 |
| JP | 1-212247 A | 8/1989 |

(Continued)

OTHER PUBLICATIONS

"Average Relative Humidity(%)", 2002, [online] [retrieved Jan. 13, 2012]. Retrieved from the National Climatic Data Center using Internet <URL: http://www.ncdc.noaa.gov/oa/ climate/online/ccd/avgrh.html>.*

(Continued)

*Primary Examiner* — Erin Snelting
(74) *Attorney, Agent, or Firm* — Birch, Stewart, Kolasch & Birch, LLP

(57) ABSTRACT

Disclosed is a method of producing a synthetic quartz glass for excimer laser by depositing on a target silica particulates obtained by subjecting a silica raw material to vapor-phase hydrolysis or oxidative decomposition in an oxyhydrogen flame in a vacuum sintering furnace to form a porous silica base material, vitrifying the porous silica base material, and subjecting the vitrified material to hot forming, an annealing treatment and a hydrogen doping treatment, wherein the vitrification of the porous silica base material includes: (a) a step of holding a vacuum pressure at or below 20.0 Pa in a temperature range from 400° C., inclusive, to 900° C., exclusive; (b) a step of holding a vacuum pressure at or below 10.0 Pa in a temperature range from 900° C., inclusive, to 1100° C., exclusive; and (c) a step of holding a vacuum pressure at or below 3.0 Pa in a temperature range from 1100° C. to a transparent-vitrification temperature.

6 Claims, 2 Drawing Sheets

(56) References Cited

U.S. PATENT DOCUMENTS

2008/0119346 A1  5/2008  Otsuka et al.
2009/0004088 A1  1/2009  Kuehn et al.

FOREIGN PATENT DOCUMENTS

| JP | 6-166522 A | 6/1994 |
| JP | 7-6697 U | 1/1995 |
| JP | 9-59034 A | 3/1997 |
| JP | 2001-316122 A | 11/2001 |
| JP | 2003-221245 A | 8/2003 |
| JP | 2005-67913 A | 3/2005 |
| JP | 2005-179088 A | 7/2005 |
| JP | 2007-250640 A | 9/2007 |
| JP | 2008-63181 A | 3/2008 |

OTHER PUBLICATIONS

Khotimchenko et al., "Determining the content of hydrogen dissolved in quartz glass using the methods of: Raman scattering and mass spectrometry", Zurnal Prikladnoi Spektroskopii, Jun. 1987, vol. 46, No. 6, pp. 987-991.

Extended European Search Report, dated Mar. 6, 2012, for European Application No. 10250087.3.

Office Action for Japanese Application No. 2010-007754, dated May 28, 2013.

* cited by examiner

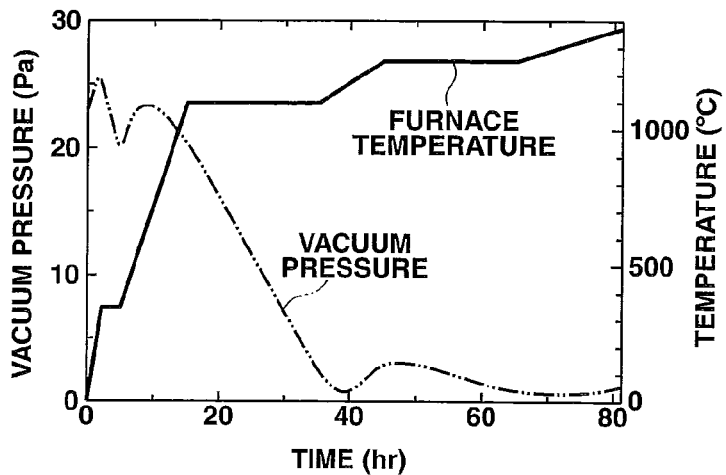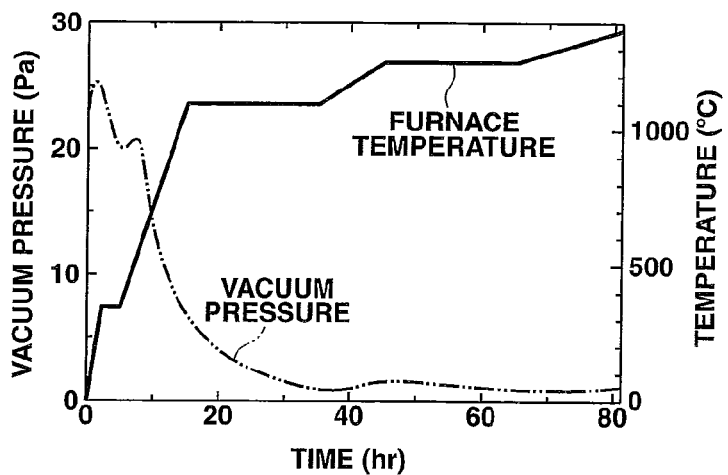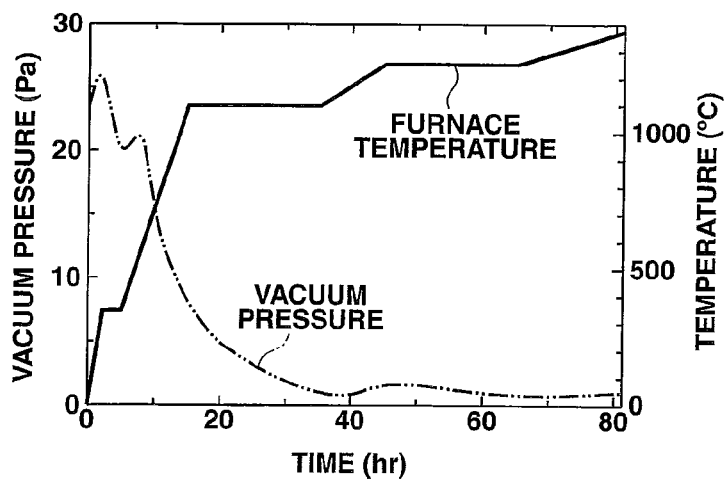

METHOD OF PRODUCING SYNTHETIC QUARTZ GLASS FOR EXCIMER LASER

CROSS-REFERENCE TO RELATED APPLICATION

This non-provisional application claims priority under 35 U.S.C. §119(a) on Patent Application No. 2009-008648 filed in Japan on Jan. 19, 2009, the entire contents of which are hereby incorporated by reference.

TECHNICAL FIELD

The present invention relates to a method of producing a synthetic quartz glass for an excimer laser, particularly for ArF excimer laser.

BACKGROUND ART

As is well known, the degree of integration of semiconductor integrated circuits has been being remarkably enhanced in recent years. Attendant on this trend, shifting to shorter wavelengths of exposure light sources in lithographic process in the production of semiconductor devices has progressed. At present, the main stream is photolithography in which excimer lasers ranging from KrF excimer laser (248.3 nm) to ArF excimer laser (193.4 nm) are used. The introduction of immersion technique for realizing a higher NA is considered to progress from now on, in order to achieve further refining or miniaturization of semiconductor devices. In addition, enhancement of the output of the ArF excimer laser used as a light source is considered to progress, for the purpose of enhancing the throughput during the production of semiconductor devices.

Attendant on the tendency toward light sources with shorter wavelengths and lenses with higher NA values, such optical parts used in exposure apparatuses as lens, window, prism, and synthetic quartz glass for photomask are required to be more enhanced in precision. Especially, in regard of the ArF excimer laser, there are a multiplicity of important requirements such as high ultraviolet (UV) transmittance, high uniformity of transmission properties, stability and uniformity of transmittance at the time of irradiation with an excimer laser. Further, depending on the adoption of polarized illumination, reduction of birefringence in plane is also required.

As for the transmittance to UV rays, in the ArF excimer laser, for example, the transmittance to rays of a wavelength of 193.4 nm is the most important. In the case of synthetic quartz glass, its transmittance to rays in the wavelength range around 193.4 nm is lowered according to the content of impurities. Typical examples of the impurities are alkali metals such as Na, and metallic elements such as Cu and Fe. In the production of synthetic quartz glass, a silane or silicone having an extremely high purity may be used as a raw material, whereby the concentration of metallic impurities in the resulting synthetic quartz glass can be lowered to such a level (<1 ppb) as to be non-detectable even if measured by use of a high-sensitivity detector. In the cases of Na and Cu, however, their diffusion coefficients in synthetic quartz glass are comparatively high, so that in many cases Na and Cu may be externally diffused and mixed into the product during a heat treatment. Therefore, these treatments have to be carried out with special care for reducing the possibility of such contamination.

Other than the impurities, structural defects in synthetic quartz glass are also known to exert influences on the transmittance. Famous examples of the defects are deficiency of oxygen and excess of oxygen in the Si—O—Si structure constituting the synthetic quartz glass, such as oxygen deficiency type defects (Si—Si; with absorption at 245 nm) and oxygen excess type defects (Si—O—O—Si; with absorption at 177 nm). In the case of synthetic quartz glass products for UV rays, those glass products in which these defects are present at such a level as to be measurable by general spectrometry have to be excluded at least from the beginning.

The structural defects in quartz glass, such as oxygen deficiency type defects and oxygen excess type defects, will not only lower the transmittance at wavelengths of 300 nm or below but also cause a lowering in the stability of the quartz glass at the time of irradiation with an excimer laser. Particularly, the damage in the quartz glass by ArF excimer laser is said to be five times greater than that by KrF excimer laser; therefore, this is a very important factor when the quartz glass is used for lens in exposure apparatus or the like.

In the case where synthetic quartz glass is irradiated with ArF excimer laser, it causes a phenomenon in which oxygen deficiency type defects are cleaved due to the very intense energy of the laser light to generate paramagnetic defects called E' center (E prime center), which cause absorption at 215 nm. This leads to a lowering in transmittance of the synthetic quartz glass at a wavelength of 193.4 nm. Furthermore, the E' center generation are known to cause rearrangement of a network structure in the quartz glass, resulting in a phenomenon called "laser compaction" in which density and refractive index are raised.

It is known that for improving the stability of synthetic quartz glass to irradiation with a laser, it is extremely effective to reduce the above-mentioned intrinsic defects of the synthetic quartz glass and, simultaneously, to set the concentration of hydrogen molecules in the synthetic quartz glass at a certain level or above. Besides, the fact that hydrogen molecules in synthetic quartz glass hinder the damage to the synthetic quartz glass due to irradiation with an excimer laser has been well known and under ardent researches, since it was shown in JP-A H01-212247 (Patent Document 1).

On the other hand, in recent years, a phenomenon called "laser rarefaction" in which the density and refractive index of quartz glass are lowered, contrary to the laser compaction, has come to be a problem. The laser rarefaction is considered to arise from OH groups present in quartz glass. Therefore, it is said to be preferable to use synthetic quartz glass having a low OH group concentration, as the quartz glass applied to ArF excimer laser lithography, particularly, to immersion lithography in which a polarized light source is used.

Synthetic quartz glass with a low OH group concentration is generally produced by a method called soot process or indirect process, in which silica particulates obtained by flame hydrolysis of a silica raw material are deposited and grown, followed by heating under a reduced pressure (vacuum) to vitrify the deposited and grown material into transparent glass.

Synthetic quartz glasses for ArF excimer laser which are produced by the soot process have also been disclosed, for example, in JP-A 2003-221245 (Patent Document 2) and JP-A 2005-179088 (Patent Document 3), wherein the synthetic quartz glass have a low OH group concentration, and do not have such structural defects as oxygen deficiency type defects, and in which the generation of compaction and rarefaction is restrained.

JP-A H09-059034 (Patent Document 4) shows that quartz glass having a low OH group concentration and having few oxygen deficiency type defects is obtained by a method in which a porous quartz glass body is synthesized from a high-purity silicon compound through vapor-phase chemical reactions, the porous quartz glass body is heat treated in an oxygen-containing atmosphere, and thereafter the glass body is vitrified into transparent glass in a vacuum.

JP-A 2005-067913 (Patent Document 5) shows that, for restraining the generation of oxygen deficiency type defects and oxygen excess type defects when synthesizing silica particulates by the soot process, it is necessary to set the molar ratio of $H_2$ to $O_2$ ($H_2/O_2$) in a range from 2.0 to 3.0. It has been found, however, that in the production of synthetic quartz glass having a low OH group concentration by the soot process (VAD process), synthetic quartz glass having few structural defects cannot necessarily be obtained even when the method of the above-mentioned patent document is used.

CITATION LIST

Patent Document 1: JP-A H01-212247
Patent Document 2: JP-A 2003-221245
Patent Document 3: JP-A 2005-179088
Patent Document 4: JP-A H09-059034
Patent Document 5: JP-A 2005-067913
Patent Document 6: JP-A 2008-063181

SUMMARY OF THE INVENTION

The present invention has been made in consideration of the above-mentioned circumstances. Accordingly, it is an object of the invention to provide a method of producing a synthetic quarts glass for an excimer laser which is high in stability of transmittance at the time of irradiation with an excimer laser and which has few structural defects.

The present inventors made intensive and extensive investigations for attaining the above object. As a result of the investigations, they found out that control of the degree of vacuum (or vacuum pressure) during vacuum vitrification of a porous silica raw material is important for restraining the generation of structural defects, particularly oxygen deficiency type defects, in synthetic quartz glass during the production of synthetic quartz glass for an excimer laser by the soot process (VAD process). Based on the finding, the present invention has been completed.

According to the present invention, there is provided a method of producing a synthetic quartz glass for excimer laser by depositing on a target silica particulates obtained by subjecting a silica raw material to vapor-phase hydrolysis or oxidative decomposition in an oxyhydrogen flame in a vacuum sintering furnace to form a porous silica base material, vitrifying the porous silica base material, and subjecting the vitrified material to hot forming, an annealing treatment and a hydrogen doping treatment, wherein the vitrification of the porous silica base material comprises steps of:

(a) holding a vacuum pressure at or below 20.0 Pa in a temperature range from 400° C., inclusive, to 900° C., exclusive;

(b) holding a vacuum pressure at or below 10.0 Pa in a temperature range from 900° C., inclusive, to 1100° C., exclusive; and (c) holding a vacuum pressure at or below 3.0 Pa in a temperature range from 1100° C. to a transparent-vitrification temperature.

In the above method, preferably, the humidity in the exterior of the vacuum sintering furnace is kept at or below 60% RH during the vitrification of the porous silica base material.

Besides, in the above method, preferably, the excimer laser is ArF excimer laser.

Furthermore, in the above-mentioned method, preferably, the frequency of the ArF excimer laser is not less than 4 kHz.

Advantageous Effects of Invention

According to the present invention, it is possible to provide a method of producing a synthetic quartz glass for an excimer laser which is high in stability of transmittance at the time of irradiation with an excimer laser and which has few structural defects.

BRIEF DESCRIPTION OF THE DRAWINGS

FIG. 4 is a graph showing a temperature elevation program and the vacuum pressure in the furnace in Comparative Example 2;

FIG. 5 is a graph showing a temperature elevation program and the vacuum pressure in the furnace in Comparative Example 3; and FIG. 6 is a graph showing a temperature elevation program and the vacuum pressure in the furnace in Comparative Example 4.

DETAILED DESCRIPTION OF THE PREFERRED EMBODIMENTS

Figure 1:
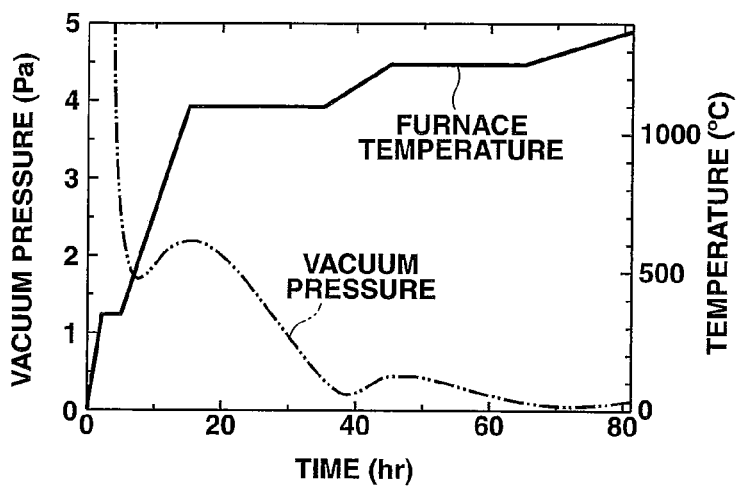
FIG. 1 is a graph showing a temperature elevation program and the vacuum pressure in a furnace in Example 1.

The production method according to the present invention is a method of producing a synthetic quartz glass by depositing on a target silica particulates obtained by vapor-phase hydrolysis or oxidative decomposition of a silica raw material compound in an oxyhydrogen flame in a vacuum sintering furnace to form a porous silica base material, vitrifying the porous silica base material, and thereafter subjecting the vitrified material to hot forming, an annealing treatment and a hydrogen doping treatment, wherein the vitrification of the porous silica base material includes the steps of:

(a) holding a vacuum pressure at or below 20.0 Pa in a temperature range from 400° C., inclusive, to 900° C., exclusive;

(b) holding a vacuum pressure at or below 10.0 Pa in a temperature range from 900° C., inclusive, to 1100° C., exclusive; and (c) holding a vacuum pressure at or below 3.0 Pa in a temperature range from 1100° C. to a transparent-vitrification temperature.

The vacuum sintering furnace is preferably one which has an inside volume of about 0.01 to 15 $m^3$.

In the first place, the vitrification of the porous silica base material will be described. In general, vitrification of a porous silica base material is carried out in a vacuum sintering furnace under a reduced pressure (vacuum) produced by a vacuum pump such as an oil rotary pump or a mechanical booster pump. One of the reasons why the vitrification is conducted at a reduced pressure (in vacuum) is to ensure that no bubble will remain in the quartz glass upon vitrification. Another of the reasons is to facilitate the removal of OH by the reduced pressure (vacuum) before vitrification of the porous silica base material, which is intended for lowering the OH group content in the synthetic quartz glass.

Meanwhile, the degree of vacuum in a vacuum sintering furnace differs depending on the individual furnace. In many cases, the difference is not dependent on the performance of the oil rotary pump or mechanical booster pump used but dependent on the closedness (air-tightness) of the furnace. For an increase in the size of synthetic quartz glass members to be produced or for enhancing the productivity, in recent years, there have been cases where porous silica base materials of large size (100 mm$\phi$×200 mmL to 400 mm$\phi$×2000 mmL) are vitrified or where one or several (two to five) porous silica base materials are vitrified at the same time. In response to this, there is a trend toward an increase in the size of the vacuum sintering furnace. Therefore, there is a tendency that a door or doors of the vacuum sintering furnace are enlarged in size and that the number of thermocouples used is increased. The portions such as the doors and the thermocouples in the vacuum sintering furnace are liable to serve as portions which cause a lowering in the degree of vacuum, on a structural basis. Consequently, the difference in closedness (air-tightness) leads to the difference in the degree of vacuum between the individual vacuum sintering furnaces.

In a vacuum sintering furnace with a low degree of vacuum, therefore, it is considered that atmospheric air, though in an extremely minute quantity, is penetrating into the furnace during the vitrification of a porous silica base material.

The penetration of air into the vacuum sintering furnace causes the penetration of moisture (water vapor) contained in the air, simultaneously with the penetration of nitrogen and oxygen. It is considered, therefore, that the water undergoes the following reaction with the carbon heater and carbon-made members in the furnace, producing $H_2$ gas.

$$H_2O + C \rightarrow CO + H_2 \quad \text{Formula (1)}$$

The quantity of the $H_2$ gas produced in this instance is expected to be extremely minute, and part of the $H_2$ gas is discharged to the exterior of the furnace by the vacuum pump. Since the porous silica base material has a great specific surface area as well as a high surface activity and a high temperature is kept in the furnace, however, a part of the $H_2$ gas is considered to easily react with the porous silica base material as represented by the following formula, thereby producing Si—H bonds.

$$H_2 + Si-O-Si \rightarrow Si-OH + Si-H \quad \text{Formula (2)}$$

The Si—H bonds thus generated in the porous silica base material are considered to generate oxygen deficiency type defects (Si—Si bonds) through the following reaction when the porous silica base material is exposed to further higher temperatures and vitrified into transparent glass.

$$2Si-H \rightarrow Si-Si + H_2 \quad \text{Formula (3)}$$

In this case, the $H_2$ gas produced as represented by the formula (1) readily reacts with the porous silica base material according to the formula (2), so that the reaction of the formula (2) is liable to take place on the surface of the porous silica base material. Therefore, there is a tendency such that the number of the oxygen deficiency type defects is greater in a peripheral portion of the ingot of the synthetic quartz glass and decreases toward a central portion of the ingot. Incidentally, the presence or absence of the oxygen deficiency type defects in the synthetic quartz glass can be examined in terms of the presence or absence of fluorescence in the vicinity of 390 nm upon irradiation with UV rays having wavelengths of not more than 300 nm.

The reaction of the above formula (3) proceeds even when the furnace temperature is comparatively low. It has been confirmed by the present inventors' investigations that this reaction proceeds at or above 400° C. Taking this into account, in the step of vitrifying the porous silica base material in the present invention, the vacuum pressure is maintained at or below 20.0 Pa at a temperature of not less than 400° C. As for the upper limit of the temperature, the temperature is lower than 900° C. The vacuum pressure is preferably maintained at or below 15.0 Pa, more preferably at or below 10.0 Pa, and most preferably at or below 5.0 Pa. Such a setting is needed for restraining the generation of the oxygen deficiency type defects due to the reaction of the above formula (3). There is no particular lower limit for the vacuum pressure. Normally, the vacuum pressure is not less than 0.0001 Pa, particularly not less than 0.001 Pa.

Incidentally, a large quantity of water is adsorbed on the porous silica base material before the temperature is raised for vitrification. Like the water externally penetrating into the furnace, the water thus adsorbed will also cause the generation of the oxygen deficiency type defects. Therefore, in vitrifying the porous silica base material, it is effective to hold the porous silica base material in a temperature range of not more than 400° C., for example 150 to 350° C., for a period of time of 30 minutes to 6 hours so as to effect desorption of the adsorbed water. In addition, this is effective also because the degree of vacuum in the furnace can be enhanced by holding the porous silica base material at a fixed temperature.

Besides, during the vitrification of the porous silica base material, the vacuum pressure is kept at or below 10.0 Pa in a temperature range from 900° C., inclusive, to 1100° C., exclusive. The vacuum pressure in this step is preferably kept at or below 5.0 Pa, further preferably at or below 2.5 Pa. Incidentally, in this case, also, there is no particular lower limit for the vacuum pressure. Normally, the vacuum pressure is not less than 0.0001 Pa, particularly not less than 0.001 Pa.

Further, during the vitrification of the porous silica base material, the vacuum pressure is maintained at or below 3.0 Pa in a temperature range from 1100° C. to a transparent-vitrification temperature (the temperature at which the vitrification of the porous silica base material is vitrified into transparent glass). The vacuum pressure in this step is preferably kept at or below 1.0 Pa, and further preferably at or below 0.5 Pa, thereby effecting vitrification. The transparent-vitrification temperature means a maximum temperature in the process of vitrification of the porous silica base material, and, normally, it is 1350 to 1450° C. There is no particular lower limit for the vacuum pressure. Normally, the vacuum pressure is not less than 0.0001 Pa, particularly not less than 0.001 Pa.

The reaction of the above formula (3) proceeds more easily as the furnace temperature is higher, and, in this case, generation of oxygen deficiency type defects in the quartz glass is more liable to take place. Therefore, as the furnace temperature is higher, it is more keenly required to restrain the penetration of a minute quantity of water into the furnace, and it is desired to maintain the quartz glass at a higher degree of vacuum (at a lower vacuum pressure).

From this point of view, also, in the method of producing a synthetic quartz glass for excimer laser according to the present invention, it is preferable to maintain the humidity in the exterior of the vacuum sintering furnace at or below 60% RH. More preferably, the humidity is kept at or below 50% RH. In this case, a lower humidity is more desirable. Normally, however, the humidity in the exterior of the furnace is not less than 10% RH, particularly not less than 20% RH.

It is difficult to completely prevent the atmospheric air from penetrating into the vacuum sintering furnace. Even if it is possible to completely prevent the penetration, equipment on a large scale is needed for the purpose, which is disadvantageous on a cost basis. As the humidity of the atmospheric air penetrating into the furnace is higher, generation of oxygen deficiency type defects in the quartz glass is more likely to take place. Accordingly, it is possible, by keeping the humidity in the outside of the furnace at a low level, to restrain the generation of the oxygen deficiency type defects in the quartz glass. This is very effective means on a cost basis, as well.

In the production method according to the present invention in which a synthetic quartz glass is produced while maintaining a high degree of vacuum and maintaining the humidity outside the furnace at a low level as above-mentioned, the CO concentration in an exhaust gas from the vacuum pump for the vacuum sintering furnace can be made to be not more than 10 ppm. Maintaining the CO concentration at a low level is important also from the viewpoint of securing safety during the production of the synthetic quartz glass.

Now, the method of producing a synthetic quartz glass for excimer laser according to the present invention will be described more in detail below. The production method according to the present invention is a method in which silica particulates obtained by vapor-phase hydrolysis or oxidative decomposition of a silica raw material by an oxyhydrogen flame are deposited on a target to form a porous silica base material, and the porous silica base material is vitrified by melting in a high-temperature furnace to produce a synthetic quartz glass ingot (so-called soot process, particularly, VAD process). Further, the resulting ingot is subjected to hot forming and an annealing treatment, and is thereafter subjected to a hydrogen doping treatment, whereby a synthetic quartz glass can be obtained.

In this case, the silica compound used as a starting material is a high-purity organic silicon compound, preferably a silane compound represented by the following general formula (1) or (2) or a siloxane compound represented by the following general formula (3) or (4).

$$R_n SiX_{4-n} \quad (1)$$

where R is a hydrogen atom or an aliphatic monovalent hydrocarbon group, X is a halogen atom such as chlorine and bromine or an alkoxy group, and n is an integer of 0 to 4.

$$(R^1)_n Si(OR^2)_{4-n} \quad (2)$$

where $R^1$ and $R^2$, which may be same or different, are each an aliphatic monovalent hydrocarbon group, and n is an integer of 0 to 3.

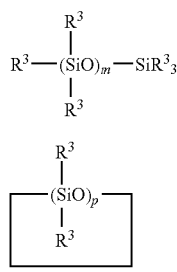

where $R^3$ is a hydrogen atom or an aliphatic monovalent hydrocarbon group, m is an integer of at least one, particularly 1 or 2, and p is an integer of 3 to 5.

Examples of the aliphatic monovalent hydrocarbon group in each of R, $R^1$, $R^2$, and $R^3$ include alkyl groups of 1 to 4 carbon atoms such as methyl, ethyl, propyl, n-butyl and tert-butyl, cycloalkyl groups of 3 to 6 carbon atoms such as cyclohexyl, and alkenyl groups of 2 to 4 carbon atoms such as vinyl and allyl.

Specific examples of the silane compound represented by the above general formula (1) or (2) include $SiCl_4$, $CH_3SiCl_3$, $Si(OCH_3)_4$, $Si(OCH_2CH_3)_4$, $CH_3Si(OCH_3)_3$, etc., and specific examples of the siloxane compound represented by the above general formula (3) or (4) include hexamethyldisiloxane, hexamethylcyclotrisiloxane, octamethylcyclotetrasiloxane, decamethylcyclopentasiloxane, etc.

A quartz-made burner for forming the oxyhydrogen flame is supplied with the silane or siloxane compound as a raw material, a combustible gas such as hydrogen, carbon monoxide, methane and propane, and a combustion-sustaining gas such as oxygen.

Incidentally, the burner supplied with the silane or siloxane compound together with the combustible gas such as hydrogen and the combustion-sustaining gas such as oxygen may be a multiple-wall tube burner, particularly a quadruple-wall tube burner or a sextuple-wall tube burner, in the same manner as usual. In fact, for enhancing the uniformity of density of the porous silica base material to be produced, it is preferable to form the burner at a higher degree of multipleness of tube walls, so as to enlarge the oxyhydrogen flame formed by the burner, and thereby to heat the whole part of the surface where the porous silica base material is deposited.

In order to lower the quantity of OH groups in the glass in a uniform manner, the bulk density serving as an indicator of the degree of sintering of the porous silica base material is preferably set in the range of 0.3 to 0.7 g/cm³, more preferably 0.4 to 0.6 g/cm³.

The apparatus for producing the porous silica base material may be of an upright type or a horizontal type.

The porous silica base material thus produced is vitrified into transparent glass in the vacuum sintering furnace while keeping the above-mentioned vacuum pressure (or degree of vacuum), thereby obtaining a synthetic quartz glass ingot. In this case, for restraining the rarefaction phenomenon of the quartz glass, it is preferable to lower the concentration of OH groups in the glass. The OH group concentration can be lowered, for example, by use of the method described in JP-A 2008-063181.

In this case, the OH group concentration in the synthetic quartz glass of the present invention is preferably in the range of 5 to 40 ppm. A more preferable range is 5 to 30 ppm. If the OH group concentration is below 5 ppm, it may be impossible to maintain good excimer laser endurance. If the OH group concentration exceeds 40 ppm, on the other hand, the rarefaction phenomenon may be induced thereby.

In order to obtain a desired shape and a desired surface condition, the synthetic quartz glass ingot obtained as above is processed through the steps of:

(i) hot forming the ingot into a desired shape in a temperature range of 1700 to 1900° C.;

(ii) annealing the hot formed synthetic quartz glass block in a temperature range of 1000 to 1300° C.;

(iii) slicing the annealed synthetic quartz glass block into a desired thickness, as required; and (iv) polishing the sliced synthetic quartz glass substrate, as required; and then (v) the synthetic quartz glass is heat treated for a predetermined time in a hydrogen atmosphere, in a temperature range of 200 to 500° C., and at a pressure of not lower than the atmospheric pressure, whereby the excimer laser endurance of the synthetic quartz glass can be enhanced.

The method for the hot forming will be described more in detail. Impurities adhering to the surface of the synthetic quartz glass ingot produced as above-described and foams present in the vicinity of the surface are removed by a cylindrical grinder or the like. Thereafter, the dirt or the like adhering to the surface is removed by etching in hydrofluoric acid, followed by washing well in pure water and drying in a clean booth or the like. Next, the hot forming for obtaining a desired shape is carried out. Subsequently, in a vacuum melting furnace, a die formed of a high-purity carbon material or the like is charged with the synthetic quartz glass ingot, and the assembly is held in a furnace atmosphere of an inert gas such as argon, at a pressure slightly reduced from the atmospheric pressure and in a temperature range of 1700 to 1900° C. for 30 to 120 minutes, whereby the cylindrical ingot is turned into a synthetic quartz glass block having a desired shape. The procedure of cleaning the surface of the synthetic quartz glass ingot and then hot forming the ingot is important for ensuring that the internal transmittance (at a glass thickness of 10 mm) to ArF excimer laser (193.4 nm) is maintained at or above 99%.

Further, the annealing treatment is conducted by holding the synthetic quartz glass block in atmospheric air or an inert gas atmosphere such as nitrogen in an atmospheric-pressure furnace in a temperature range of 1000 to 1300° C. for at least 5 hours, followed by slow cooling to the vicinity of the distortion temperature over several hours (normally, 10 to 200 hours). By this it is possible to suppress the birefringence (at 25° C., here and hereafter) in the synthetic quartz glass block to or below 20 nm/cm. The birefringence can be suppressed, for example, to or below 2 nm/cm, by controlling the maximum temperature, the rate of cooling to the vicinity of the distortion temperature, and the temperature at which the power supply is turned OFF.

The treatment of the synthetic quartz glass block with hydrogen is conducted as follows. The glass block is placed in a furnace, the furnace temperature is set in the range of 200 to 500° C., preferably 300 to 400° C., the concentration of hydrogen put into a nitrogen atmosphere in the furnace is set to a value of 20 to 100%, a furnace pressure is set at a value of not lower than the atmospheric pressure, particularly 0.2 to 0.9 MPa, and the glass block is maintained in these conditions for 10 to 200 hours, whereby hydrogen is introduced into the glass block in the form of hydrogen molecules. These conditions may be selected according to the set point of the concentration of hydrogen molecules to be introduced into the glass block.

Incidentally, if the treating temperature is below 200° C., the treating time required for obtaining the desired hydrogen molecule concentration may become longer due to the lowered rate of diffusion of hydrogen molecules into the quartz glass, which is disadvantageous on a productivity. If the treating temperature is above 500° C., on the other hand, the initial absorption upon irradiation with ArF excimer laser may be increased, and the birefringence in the synthetic quartz glass may be raised. When the furnace temperature is further higher, there arises a fear of diffusion of impurities into the glass from the furnace materials.

The inventive synthetic quartz glass produced by the above-mentioned method has a high internal transmittance, and hardly shows variations in physical properties, such as compaction and rarefaction, which might arise upon irradiation with excimer laser from structural defects such as oxygen deficiency type defects. Therefore, the synthetic quartz glass according to the present invention is preferable for use as an optical member for excimer laser, particularly ArF excimer laser, for example, optical parts used in exposure apparatus, such as lens, window, prism, synthetic quartz glass for photomask.

The synthetic quartz glass according to the present invention is particularly preferable as an optical member for use in a severe condition where, for example, the frequency of ArF excimer laser is not less than 4 kHz, or, further, not less than 6 kHz.

EXAMPLES

Now, the present invention will be described more in detail by showing Examples and Comparative Examples, but the invention is not limited to the following Examples. Incidentally, the measuring methods for internal transmittance, birefringence, hydrogen molecule concentration, and the presence/absence of oxygen deficiency type defects used in the following examples are as follows.

Internal Transmittance:
Measured by UV spectrophotometry, specifically by use of a transmittance measuring apparatus, Cary 400, produced by VARIAN, Inc.

Birefringence:
Measured by a birefringence measuring apparatus, specifically by a birefringence measuring apparatus, ABR-10A, produced by UNIOPT Corporation, Ltd.

Hydrogen Molecule Concentration:
Measured by laser Raman spectrophotometry, specifically by the method shown in Zhurnal Priklandnoi Spektroskopii Vol. 46, No. 6, pp. 987 to 991, 1987. The measurement was conducted by a photon counting method, using an apparatus, NRS-2100, produced by JASCO Corporation. In the measurement of hydrogen molecule concentration by argon laser Raman spectrophotometry, the measured values may vary depending on the sensitivity curve of the detector. In view of this, the measurements were calibrated by use of a standard sample.

Presence/Absence of Oxygen Deficiency Type Defects:
Measured by use of a spectrofluorophotometer, specifically a spectrofluorophotometer, F-4500, produced by Hitachi High-Technologies Corporation, and using an excitation light source at 248 nm.

Example 1

Production of Porous Silica Base Material

A burner as described in JP-A 2001-316122 was used. Specifically, the use was made of a quadruple-wall tube burner having a central tube nozzle (first nozzle), a second ring tube (second nozzle) disposed concentrically so as to surround the central tube nozzle, a third ring tube (third nozzle) surrounding the second ring tube, and a fourth ring tube (fourth nozzle) surrounding the third ring tube.

The central tube nozzle (first nozzle) was supplied with 4000 g/hr of trichloromethylsilane as raw material and with 1.6 Nm$^3$/hr of nitrogen. The second nozzle was supplied with 2 Nm$^3$/hr of oxygen and 0.3 Nm$^3$/hr of nitrogen. The third nozzle was supplied with 10 Nm$^3$/hr of hydrogen. The fourth nozzle was supplied with 6 Nm$^3$/hr of oxygen. By the oxyhydrogen flame from the burner placed in an upright type furnace, the raw material gas was subjected to oxidation or combustion decomposition to form silica particulates, which were deposited on a quartz-made target being in rotation, to produce a porous silica base material. The porous silica base material had a size of 250 mmϕ×1000 mmL and a bulk density of 0.45 g/cm$^3$.

Vitrification of Porous Silica Base Material into Transparent Glass

The porous silica base material produced as above was placed in a vacuum sintering furnace using an oil rotary pump and a mechanical booster pump as vacuum pumps and having a carbon heater as a heat source and a size of 1100 mmφ×2300 mL, and then was vitrified into transparent glass, to obtain a transparent synthetic quartz glass ingot having a size of 150 mmφ×600 mmL. A temperature elevation program and the vacuum pressure in the furnace used in this case are shown in FIG. 1. During the vitrification into transparent glass, the humidity outside the furnace was maintained at 40% RH. The CO concentration in the exhaust gas from the vacuum pumps was not more than 1 ppm.

Presence/Absence of Oxygen Deficiency Type Defects

Rod-like samples with a section of 12 mm square were blanked from a tip-side portion and a target-side portion of the synthetic quartz glass ingot obtained as above. The six faces of each of the samples were polished and washed. Thereafter, a central portion and a peripheral portion of each of the samples were subjected to fluorescence measurement (excitation/irradiation wavelength: 235 nm, measurement wavelength: 390 nm) by the spectrofluorophotometer, to check the presence or absence of oxygen deficiency type defects. The results are shown in Table 1.

Hot Forming and Annealing Treatment of Synthetic Quartz Glass Ingot

The surface of the synthetic quartz glass ingot after the samples for fluorescence measurement were blanked therefrom was ground by a cylindrical grinder. Thereafter, the glass ingot was immersed in 50 wt % solution of hydrofluoric acid for cleaning the surface thereof, followed by washing in a pure water tank and drying in a clean booth.

The ingot thus dried was placed in a high-purity carbon-made die preliminarily purified by heating at 1800° C. in vacuum. In this condition, the ingot was hot formed by heating at 1780° C. in an argon gas atmosphere for 40 minutes. Thereafter, the ingot was subjected to an annealing treatment. Specifically, the ingot was held at 1200° C. for two hours, followed by cooling to 1000° C. at a cooling rate of 2° C./hr, to produce a synthetic quartz glass block measuring 160 mm×160 mm×200 mmL.

Hydrogen Doping Treatment

The synthetic quartz glass block was sliced to a thickness of about 7 mm, and the sliced substrate was placed in a quartz glass tube preliminarily subjected to a purifying treatment. A hydrogen doping treatment was carried out at a temperature of 380° C., a hydrogen concentration of 20 vol %, and a pressure of 0.2 MPa for 100 hours. The concentration of hydrogen molecules in the synthetic quartz glass substrate after the treatment is shown in Table 1.

The synthetic quartz glass substrate was served to measurement of distribution of internal transmittance at a wavelength of 193.4 nm, distribution of concentration of OH groups, and birefringence value (maximum value in the substrate at 25° C.). The measurement results are shown in Table 1.

Example 2

Figure 2:
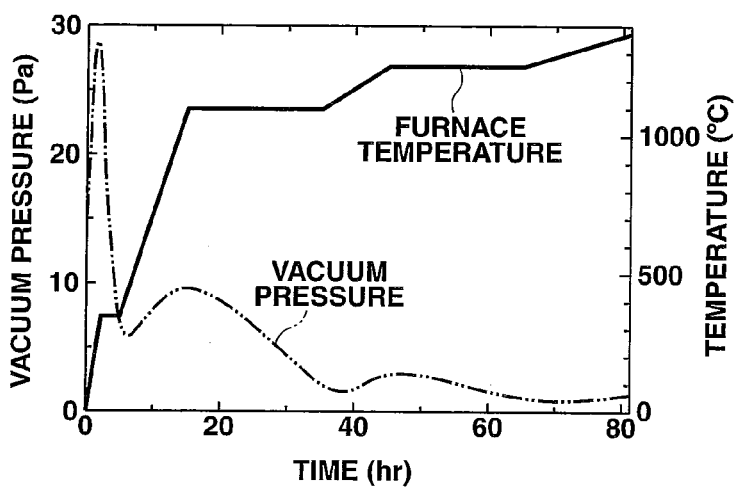
FIG. 2 is a graph showing a temperature elevation program and the vacuum pressure in the furnace in Example 2.

A porous silica base material produced in the same manner as in Example 1 was vitrified into transparent glass by using the same vacuum sintering furnace as in Example 1 and following the same temperature elevation program as in Example 1. In this case, the output of the mechanical booster pump was intentionally lowered, thereby lowering the degree of vacuum in the furnace. The temperature elevation program and the vacuum pressure in the furnace are shown in FIG. 2. In this case, the humidity outside the furnace was maintained at 40% RH. The CO concentration in the exhaust gas from the vacuum pumps was not more than 1 ppm.

Further, a synthetic quartz glass substrate subjected to the same fluorometry, hot forming, annealing treatment and hydrogen doping treatment as in Example 1 was served to measurement of the distribution of internal transmittance at a wavelength of 193.4 nm, the distribution of OH group concentration, birefringence value (maximum value in the substrate), and hydrogen molecule concentration. The measurement results are shown in Table 1.

Comparative Example 1

Figure 3:
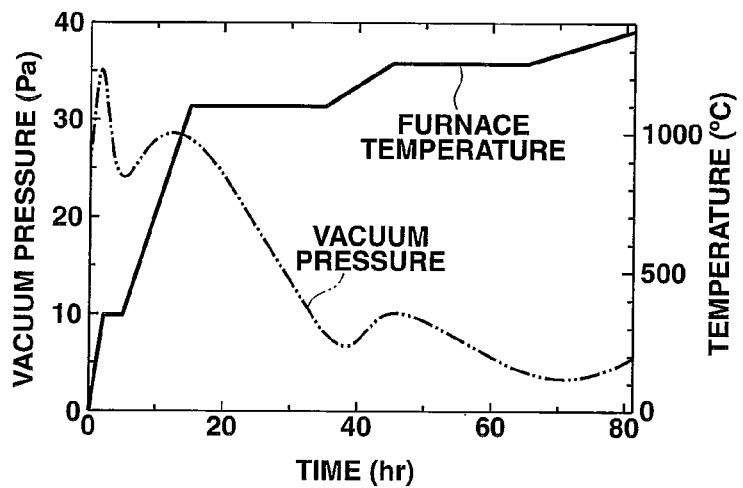
FIG. 3 is a graph showing a temperature elevation program and the vacuum pressure in the furnace in Comparative Example 1.

A porous silica base material produced in the same manner as in Example 1 was vitrified into transparent glass by use of a vacuum sintering furnace in which it is difficult to raise the degree of vacuum, unlike the vacuum sintering furnace used in Example 1. The temperature elevation program was the same as used in Example 1. In this case, vacuum pumps having the same power as in Example 1 were used for the vacuum sintering furnace. The temperature elevation program and the vacuum pressure in the furnace are shown in FIG. 3. The humidity outside the furnace was maintained at 40% RH. The CO concentration in the exhaust gas from the vacuum pumps was in the range of 1 to 15 ppm.

Further, a synthetic quartz glass substrate subjected to the same fluorometry, hot forming, annealing treatment and hydrogen doping treatment as in Example 1 was served to measurement of the distribution of internal transmittance at a wavelength of 193.4 nm, the distribution of OH group concentration, birefringence value (maximum value in the substrate), and hydrogen molecule concentration. The measurement results are shown in Table 1.

Comparative Example 2

A porous silica base material produced in the same manner as in Example 1 was vitrified into transparent glass by using the same vacuum sintering furnace and vacuum pumps as used in Example 1 and following the same temperature elevation program in Example 1. In this case, in the temperature range from room temperature to 1000° C., the atmospheric air outside the furnace was intentionally introduced slightly into the furnace. The temperature elevation program and the vacuum pressure in the furnace are shown in FIG. 4. The humidity outside the furnace was maintained at 40% RH. The CO concentration in the exhaust gas from the vacuum pumps was in the range of 1 to 15 ppm.

Further, a synthetic quartz glass substrate subjected to the same fluorometry, hot forming, annealing treatment and hydrogen doping treatment as in Example 1 was served to measurement of the distribution of internal transmittance at a wavelength of 193.4 nm, the distribution of OH group concentration, birefringence value (maximum value in the substrate), and hydrogen molecule concentration. The measurement results are shown in Table 1.

Comparative Example 3

A porous silica base material produced in the same manner as in Example 1 was vitrified into transparent glass by using the same vacuum sintering furnace and vacuum pumps as used in Example 1 and following the same temperature elevation program as in Example 1. In this case, in the temperature range from room temperature to 600° C., the atmospheric air outside the furnace was intentionally introduced slightly into the furnace. The temperature elevation program and the vacuum pressure in the furnace are shown in FIG. 5. The humidity outside the furnace was maintained at 40% RH. The CO concentration in the exhaust gas from the vacuum pumps was in the range of 1 to 15 ppm.

Further, a synthetic quartz glass substrate subjected to the same fluorometry, hot forming, annealing treatment and hydrogen doping treatment as in Example 1 was served to measurement of the distribution of internal transmittance at a wavelength of 193.4 nm, the distribution of OH group concentration, birefringence value (maximum value in the substrate), and hydrogen molecule concentration. The measurement results are shown in Table 1.

Comparative Example 4

A porous silica base material produced in the same manner as in Example 1 was vitrified into transparent glass by using the same vacuum sintering furnace and vacuum pumps as used in Example 1 and following the same temperature elevation program as in Example 1. In this case, in the temperature range from room temperature to 600° C., the atmospheric air outside the furnace was intentionally introduced slightly into the furnace. The temperature elevation program and the vacuum pressure are shown in FIG. 6. Since the humidity outside the furnace was not controlled, the humidity was in the range of 65 to 75% RH. The CO concentration in the exhaust gas from the vacuum pumps was in the range of 1 to 15 ppm.

Further, a synthetic quartz glass substrate subjected to the same fluorometry, hot forming, annealing treatment and hydrogen doping treatment as in Example 1 was served to measurement of the distribution of internal transmittance at a wavelength of 193.4 nm, the distribution of OH group concentration, birefringence value (maximum value in the substrate), and hydrogen molecule concentration. The measurement results are shown in Table 1.

depositing on a target silica particulates in a vacuum sintering furnace to form a porous silica base material;

vitrifying the porous silica base material to obtain a vitrified material; and subjecting the vitrified material to hot forming, an annealing treatment and a hydrogen doping treatment, so that the synthetic quartz glass suitable for use in an excimer laser is produced, wherein the silica particulates have been obtained by subjecting a silica raw material to vapor-phase hydrolysis or oxidative decomposition in an oxyhydrogen flame, and the vitrification of the porous silica base material comprises steps of:

(a) holding a vacuum pressure at or below 20.0 Pa in a temperature range from 400° C., inclusive, to 900° C., exclusive;

(b) holding a vacuum pressure at or below 10.0 Pa in a temperature range from 900° C., inclusive, to 1100° C., exclusive; and (c) holding a vacuum pressure at or below 3.0 Pa in a temperature range from 1100° C. to a transparent-vitrification temperature, wherein the porous silica base material is held in a temperature range from 150° C. to 350° C. for a period of time from 30 minutes to 6 hours, prior to the step (a).

2. The method according to claim 1, wherein a humidity in an exterior of the vacuum sintering furnace is kept at or below 60% RH during the vitrification of the porous silica base material.

3. The method according to claim 1, wherein the synthetic quartz glass is suitable for use in an ArF excimer laser.

4. The method according to claim 1, wherein the synthetic quartz glass is suitable for use in an ArF excimer laser having a frequency of not less than 4 kHz.

5. A method of producing a synthetic quartz glass for excimer laser, comprising the steps of:

TABLE 1

| | | Presence/absence of fluorescence in the vicinity of 390 nm | | | | Distribution of internal transmittance at 193.4 nm, (%) | | Distribution of concentration of OH groups (ppm) | | Maximum of birefringence (nm/cm) | Hydrogen molecule concentration ($\times 10^{17}$ molecules/cm$^3$) |
|---|---|---|---|---|---|---|---|---|---|---|---|
| | | Tip side | | Target side | | | | | | | |
| | | Central portion | Peripheral portion | Central portion | Peripheral portion | Maximum | Minimum | Maximum | Minimum | | |
| Example | 1 | absent | absent | absent | absent | 99.8 | 99.7 | 26 | 20 | 0.76 | 2.2 |
| | 2 | absent | absent | absent | absent | 99.7 | 99.7 | 38 | 28 | 0.82 | 1.8 |
| Comparative Example | 1 | present | present | present | present | 99.7 | 99.7 | 52 | 40 | 1.52 | 1.9 |
| | 2 | present | present | absent | absent | 99.8 | 99.7 | 40 | 35 | 1.21 | 1.8 |
| | 3 | absent | present | absent | absent | 99.7 | 99.7 | 34 | 27 | 1.83 | 2.0 |
| | 4 | present | present | absent | present | 99.8 | 99.7 | 36 | 28 | 1.44 | 2.1 |

Japanese Patent Application No. 2009-008648 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of producing a synthetic quartz glass for excimer laser, comprising the steps of:

depositing on a target silica particulates in a vacuum sintering furnace while supplying gases consisting of a silica raw material, nitrogen, oxygen and hydrogen to form a porous silica base material, the silica raw material consisting of at least one compound selected from the group consisting of $SiCl_4$, $CH_3SiCl_3$, $Si(OCH_3)_4$, $Si(OCH_2CH_3)_4$, $CH_3Si(OCH_3)_3$, hexamethyldisiloxane, hexamethylcyclotrisiloxane, octamethylcyclotetrasiloxane, and decamethylcyclopentasiloxane;

vitrifying the porous silica base material in an atmosphere consisting of atmospheric air to obtain a vitrified material; and subjecting the vitrified material to hot forming, an annealing treatment and a hydrogen doping treatment, so that the synthetic quartz glass suitable for use in an excimer laser is produced, wherein the silica particulates have been obtained by subjecting the silica raw material to vapor-phase hydrolysis or oxidative decomposition in an oxyhydrogen flame, and the vitrification of the porous silica base material comprises steps of:

(a) holding a vacuum pressure at or below 20.0 Pa in a temperature range from 400° C., inclusive, to 900° C., exclusive;

(b) holding a vacuum pressure at or below 10.0 Pa in a temperature range from 900° C., inclusive, to 1100° C., exclusive; and (c) holding a vacuum pressure at or below 3.0 Pa in a temperature range from 1100° C. to a transparent-vitrification temperature, wherein the porous silica base material is held in a temperature range from 150° C. to 350° C. for a period of time from 30 minutes to 6 hours, prior to the step (a).

6. The method according to claim 5, wherein the silica raw material is $CH_3SiCl_3$.

* * * * *